United States Patent
Stell et al.

(10) Patent No.: US 6,505,307 B1
(45) Date of Patent: Jan. 7, 2003

(54) METHOD AND APPARATUS FOR ENSURING DATA INTEGRITY

(75) Inventors: Jeffrey A. Stell, Exton, PA (US); Frank J. Leisz, Warrington, PA (US); Steven M. O'Brien, Audubon, PA (US); James W. Thompson, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 235 days.

(21) Appl. No.: 09/655,730

(22) Filed: Sep. 6, 2000

(51) Int. Cl.$^7$ ................................................. H02H 3/05
(52) U.S. Cl. ........................... 714/6; 714/710; 711/114; 711/162
(58) Field of Search .......................... 714/6, 5, 11, 710; 360/369; 707/10, 202; 711/111, 114, 147, 161, 162; 709/217

(56) References Cited

U.S. PATENT DOCUMENTS

| | | | |
|---|---|---|---|
| 5,504,861 A | 4/1996 | Crockett et al. | ....... 395/182.11 |
| 5,594,900 A * | 1/1997 | Cohn et al. | .................. 707/202 |
| 5,768,623 A * | 6/1998 | Judd et al. | ..................... 710/17 |
| 6,052,797 A | 4/2000 | Ofek et al. | ..................... 714/6 |
| 6,144,999 A | 11/2000 | Khalidi et al. | |
| 6,247,099 B1 * | 6/2001 | Skazinski et al. | ........... 711/117 |
| 6,442,706 B1 * | 8/2002 | Wahl et al. | .................. 365/201 |

FOREIGN PATENT DOCUMENTS

DE 199 24 900 A1 5/1999
EP 0 802 477 A1 10/1997

* cited by examiner

*Primary Examiner*—Robert Beausoliel
*Assistant Examiner*—Rita A Ziemer
(74) *Attorney, Agent, or Firm*—Woodcock Washburn; Michael B. Atlass; Mark T. Starr

(57) ABSTRACT

A method and apparatus for ensuring the coherence of multiple copies of the same data at multiple geographic locations is presented. The system operating system, the system operator or some combination of both may determine the physical disks having the file or comprising the disk families containing data which requires protection. Using the MIRROR CREATE commands in a Unisys MCP operating system environment, a mirrored disk pack set is made for each relevant physical disk identified. The disk pack set is distributed amongst at least two geographic locations. For each member of each disk pack set, the STORESAFE+ command associates a site identifier with the member corresponding to the member's geographic location. During application processing, disk writes for one member of a mirrored set are performed for each member of the set. The MCP operating system checks the results of each disk write to each of the members of the mirrored disk set. If the MCP operating system determines that a write was successful for at least one member of the mirrored set at each geographic location, then a "good" I/O result is returned to the application and application processing continues normally. By contrast, if the MCP operating system determines that for least one site identifier, no member of the set assigned the identifier experienced a successful disk write, then an IOERROR is returned, and application processing may optionally be halted.

24 Claims, 9 Drawing Sheets

Primary Site
(Pennsylvania)

METHOD AND APPARATUS FOR ENSURING DATA INTEGRITY

FIELD OF THE INVENTION

The present invention generally relates to the field of data protection and of ensuring data coherency. More particularly, the present invention relates to a method and apparatus for ensuring data coherency through the use of optimal data mirroring configurations and optimal error feedback techniques in the event of potential threats to data coherency.

BACKGROUND OF THE INVENTION

As more and more tasks are automated and performed by computerized applications, the importance of maintaining accurate data grows. It accordingly has become prudent for businesses, especially those that particularly depend upon access to accurate data, to prepare contingency plans in the event of major disasters such as site power outages, natural disasters, and the like. Because such disasters will typically be site specific, common precautions include the storage of identical copies (i.e., "mirroring") of mission critical data in geographically separated areas. Several copies of the data may exist at each location. Products for implementing such back up procedures and, in the event of a problem, for automatically writing to and reading from back up member disks of the mirrored disk sets, exist in the art.

However, current disk mirroring products suffer from certain drawbacks. For example, in the typical disk mirroring environment, if a mirrored write request is successfully delivered to a first member of a mirrored set of disks, but is not successfully delivered to other members, the system will return a successful result. Thus, applications using the mirrored data continue I/O operations with the first member of the mirrored set uninterrupted. At the same time however, following this procedure may defeat the purpose of contingency planning, since the disk used for further application processing (e R, the first member of the mirrored set in the example above) may no longer have a corresponding disk on line to use as a mirror. Thus, in the event of failure of the disk in use after further processing, there is no guarantee that a synchronized backup disk will be available. Instead, data created since the loss of mirroring capability may have to be re-created at significant cost or possibly lost entirely.

Another drawback of current disk mirroring systems is that, in the event of an error during disk writes, no information is provided regarding the location (i.e., disk site) of the problem disk(s). Thus, even where an administrator does learn of the existence of error conditions at one or more members of a mirrored disk set prior to the loss of any mission critical data, there is no immediate way of knowing the disk site(s) experiencing the problem. Thus, the proper course of action for ensuring geographically distributed disk copies are maintained, and remedying any problems, is more difficult to achieve.

SUMMARY OF THE INVENTION

The present invention addresses these drawbacks in the prior art. In particular, the present invention, which can be implemented by software running on a host system which is connected to series of geographically distributed disk sites (or other storage stores), allows a host administrator to specify a set of storage devices as a "coherent storage set" and to associate geographic site identifiers with each member of the set. In this way, the system provides an environment that features an enforced coherency of data storage policy and that also features error notification with site specific data relating to the error. A coherency of data storage environment is one in which a data write operation will return an error to the application unless the data was successfully delivered to at least one member of the coherent storage set at each geographic site. Thus, an administrator can ensure that any time applications are in operation, disk mirroring implemented over more than one geographic area is also in effect. While in past practice system administrators may have tried to adhere to such a policy, prior to the present invention no system existed to automatically guarantee such a policy.

In another aspect of the present invention, disk or other storage devices are associated with geographic site specific identifiers. Thus, when an error result is returned, the system administrator has access to information locating the site that experienced the problem. For example, the site administrator may first act to remedy the problem and bring on line any problem back up storage devices or replace the problem devices with new ones. In the alternative, the system administrator may choose to override the coherency of data storage policy environment and continue application processing, without the guarantee that geographically distributed coherency mirroring is in effect. This option may be the optimal solution, particularly in situations where continued, uninterrupted application processing is most critical.

Thus, one advantage of the present invention is that it provides a means to ensure data coherency by automatically enforcing a policy of geographically distributed disk coherency over a plurality of storage sites during application processing.

Another advantage of the present invention is that it can provide geographically based error feedback in the event of a problem, thus facilitating re-implementation of the condition of geographically distributed, functional devices with synchronized data stores.

Another advantage of the present invention is that it provides the system administrator with the flexibility to override a coherency of data storage environment in those situations where uninterrupted continuation of application processing and I/O operations is of greater importance than ensuring future data coherency.

Further advantages of the present invention will become apparent from the more detailed description below.

DETAILED DESCRIPTION OF PREFERRED EMBODIMENTS

Figure 1:
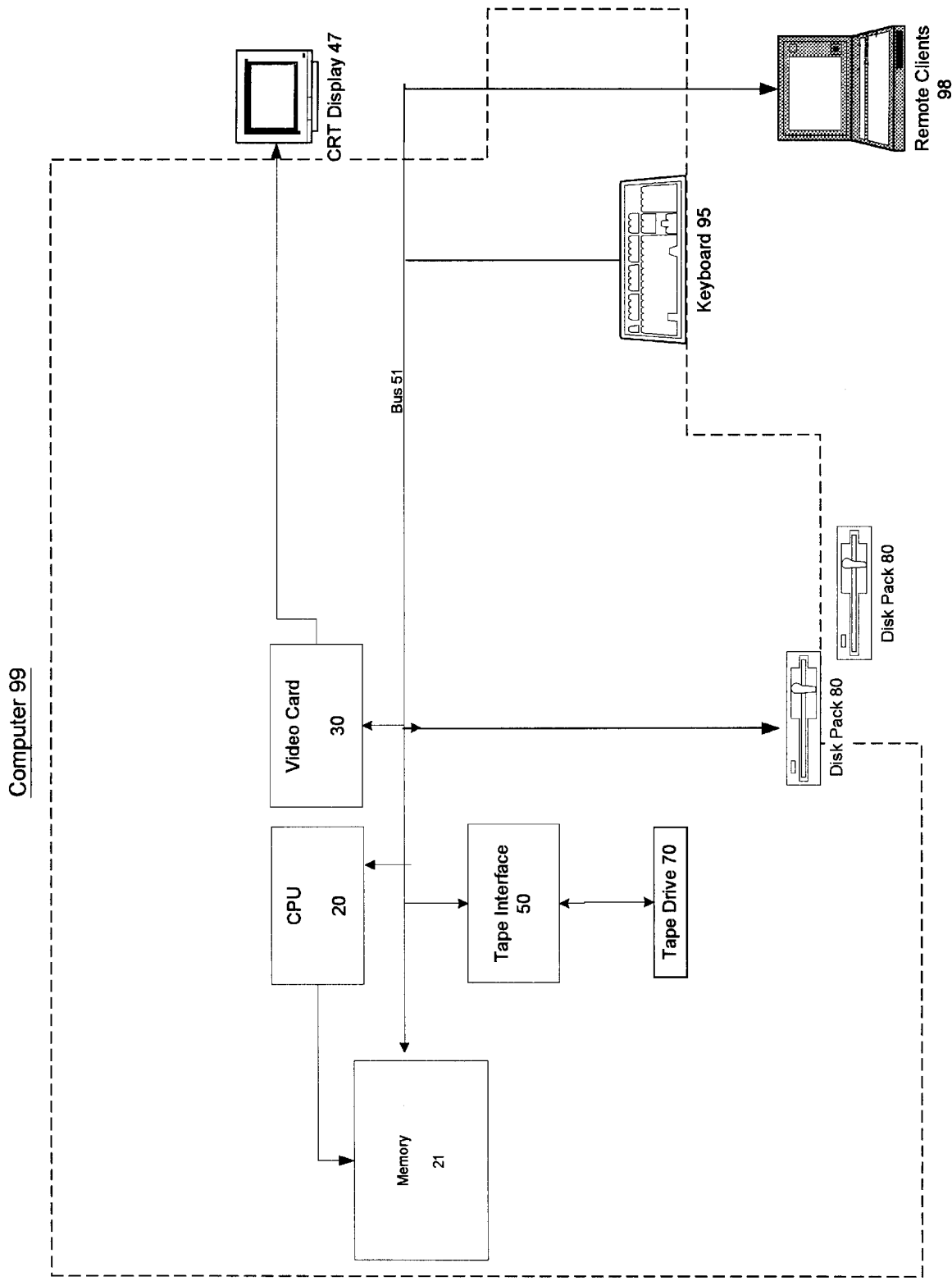
FIG. 1 is a block diagram illustrating hardware and software components of a conventional computing environment in which a method and apparatus for ensuring data coherency during program execution in accordance with the present invention may be implemented.

FIG. 1 is a block diagram illustrating hardware and software components of a conventional computing environment in which a method and apparatus for ensuring data coherency during program execution in accordance with the present invention may be implemented.

A computer 99, includes conventional computer hardware components including a Central Processing Unit ("CPU") 20, a system memory 21, and a system bus 51 that couples the system memory 21 to CPU 20 and other computer system 99 components. The system memory 21 typically includes read only memory (ROM), random access memory (RAM) or other conventional known memory types. Instructions comprising application program modules, including an operating system, are typically stored in and retrieved from memory 21 by CPU 20, which executes said instructions. In a preferred embodiment of the present invention, the computer 99 is a Unisys ClearPath NX model featuring the Unisys MCP operating system.

A user may enter commands and other input into the computer 99 via input devices such as a keyboard 95, mouse, scanner or other input device. The exemplary computer system illustrated, the keyboard 95 is coupled to CPU 20 via system bus 51. A display device 47 is also coupled to the system bus 51 via a video graphics adaptor card 30. The display device 47, which may be a CRT monitor, LCD terminal or other display, includes a screen for the display of information which is visible to the user.

The system includes storage devices, for example hard disks 80, tapes or other storage media. In a preferred implementation of the present invention, a Unisys ClearPath NX mainframe is coupled to one or, preferably, more than one disk pack 80 via a fiber optic cable. However, other storage devices could be used. Preferably, the disk packs 80 are located at sites that are geographically remote from the system 99 and from each other.

Figure 2:
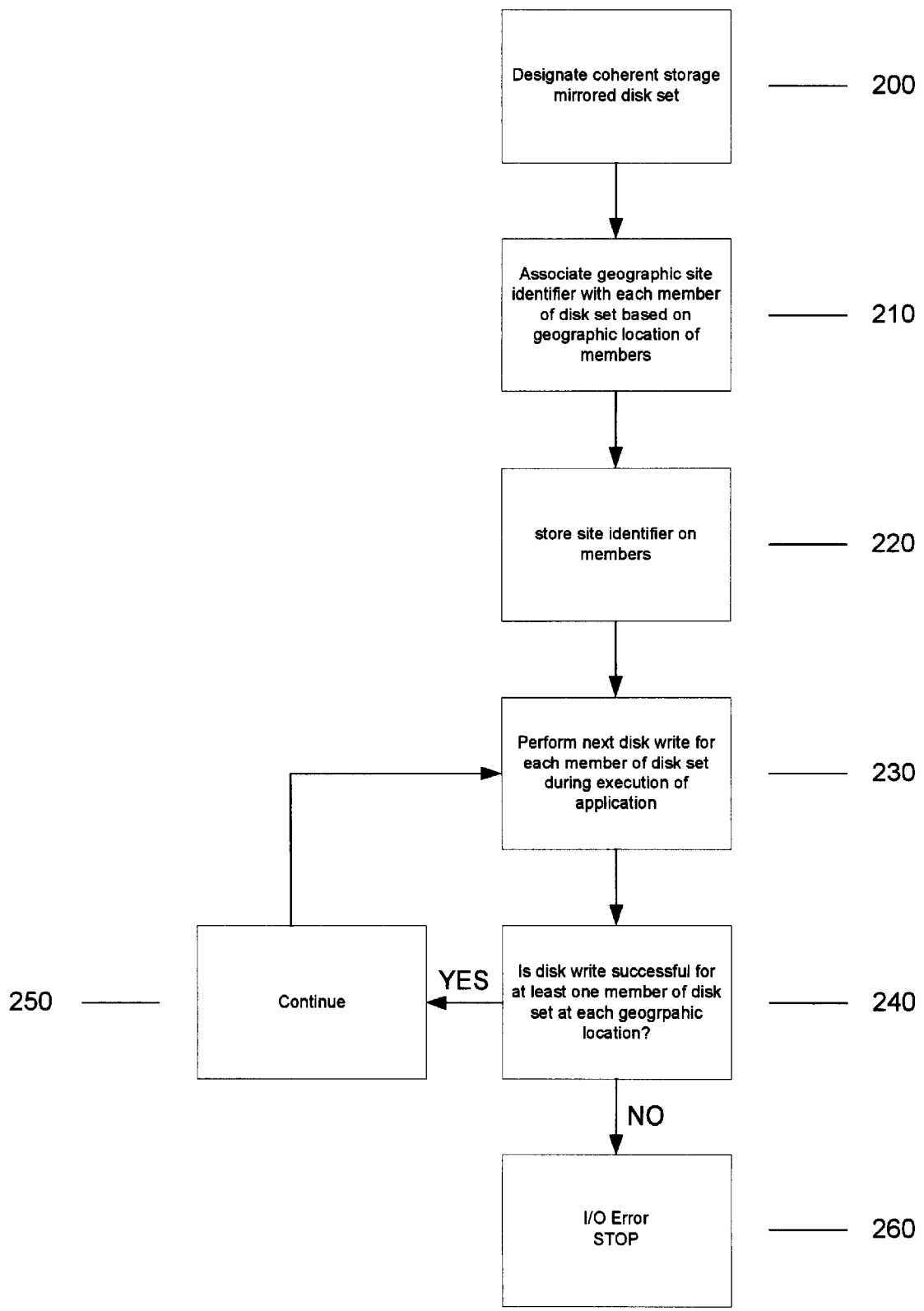
FIG. 2 is a high-level flow chart illustrating an exemplary overview of a method for ensuring data coherency during program execution in accordance with an embodiment of the present invention.

FIG. 2 is a high-level flow chart illustrating an exemplary overview of a method for ensuring data coherency during program execution in accordance with an embodiment of the present invention. In steps 200 and 210, an operator designates a set of disks as "coherent data storage" disk mirrors (ie., as exact copies of one another) and at the same time associates a geographic site identifier with each member of the specified set based on the geographic location of the members. For example, assuming the system is a Unisys Clearpath NX mainframe, the system operator might first create a set of mirrored disks via the MIRROR CREATE command, which has the following syntax: MIRROR CREATE<disk unit 1>FROM<disk unit 2>. For example, the command "MIRROR CREATE PK210 FROM PK 200" will cause the contents of disk pack PK 200 to be copied to disk pack 210 and will cause any disk writes to PK 200 during future application processing to be replicated on disk pack 210. Again, disk pack PK200 and disk pack PK 210, although coupled the Unisys ClearPath NX, are preferably located in distinct geographic regions. In addition, although for the purposes of this example it is necessary to assume that disk pack PK 200 and PK 210 are acquired by the system 99, there is no reason the disk packs may not be coupled to and acquired by another system at the same or other geographic location (though disk packs may not be acquired by two systems simultaneously).

Next, in order to designate the disk mirror set (i.e., or more generally, coherency set of storage sites) as a "coherent storage" mirrored set, a new ODT command is required. Again, a coherency of data storage environment is one where, during a disk write, an application should only receive a "good" result if the data was successfully delivered to at least one member of a mirrored set at each geographic location where members reside. If the last on line member at a particular geographic location is lost, the I/O to this mirrored set receive errors until a member at that location is created or brought back on line.

For example, the operator might use a new STORESAFE+command, which has the following syntax: "STORESAFE+<disk pack>SITENAME=<name>, where the "<disk pack>" field identifies a disk pack as member of a coherent storage mirror set and the "<name>" field is an arbitrary string identifier which preferably corresponds to the location of the identified "<disk pack>". For instance, the statement "STORESAFE+PK 300 SITENAME= PRIMARYSITE" designates the disk pack PK 300 as a coherent storage mirror that is located at a site called "PRIMARYSITE."

Similarly, following up on the earlier use of the MIRROR CREATE command, the operator might specify the following command: "STORESAFE+PK 200 SITENAME= PENNSYLVANIA," which designates the disk pack PK 200 (i.e., earlier specified as the mirror of PK210) as a coherent storage mirror located at a site labeled "PENNSYLVANIA." Although the site label "PENNSYLVANIA" is an arbitrary identifier in this example, the operator has advantageously chosen a label describing the geographic location of the disk pack PK 200. The operator might also similarly type: "STORESAFE+PK 210 SITENAME=NEW JERSEY" which designates the disk pack PK210 (i.e., earlier specified as a mirror of PK200) as a coherent storage mirror located at a site labeled "NEW JERSEY," again to signify the geographic location of the site.

As depicted in Step 220, assignment of site name labels "PENNSYLVANIA" and "NEW JERSEY" to the disk packs PK 200 and 210, respectively, via the STORESAFE command cause the storage of these labels in the label area of the corresponding disks. Thus, disk pack PK 200 stores "PENNSYLVANIA" in its label area and disk pack PK 210 stores "NEW JERSEY" in its label area. In addition, the MCP operating system keeps track of the corresponding site name identifiers ("PENNSYLVANIA" and "NEW JERSEY") assigned to the respective disk packs. The association of site specific identifiers with particular disk packs at both host MCP system and the remote pack site facilitates site specific feedback in the event of an error later on.

In an exemplary implementation of the invention, while the operator may designate which mirrors are coherent storage set mirrors via the STORESAFE+command, whether the system enforces the coherency of data storage or not is controlled by a system level coherent data storage enforcement designation. Thus, in this example a new command is required. For instance, the MCP command "STORESAFE+ENFORCE" might instruct the running MCP to enforce or invoke the coherency of data storage policy condition. Similarly, the "STORESAFE-ENFORCE" might instruct the MCP to ignore a designation of disk mirrors as a coherent storage set on the system. This provides an easy way to "turn on" and "turn off" the coherency of data storage policy for an entire system.

Next, the operator specifies the "STORESAFE+ENFORCE command and subsequently begins executing the application on the MCP system 99. Once the coherency of data storage environment parameters have been specified, application processing can begin.

Thus, in Step 230, during execution of the application, in accordance with the operator's earlier specification of the MIRROR CREATE command, each disk write to disk pack PK 200 is also performed with respect to disk pack PK 210.

In Step 240, in accordance with the operator's earlier enforcement of the coherency of data storage policy environment via the "STORESAFE+ENFORCE" command, the MCP operating system checks the results of each disk write. In addition, for all disk writes to disk packs designated as coherent data storage mirrors, the MCP determines whether, for each sitename identifier assigned to one or more of the set members, the write is successful for at least one member of the set assigned the site name identifier. For instance, in the above example, the MCP operating system checks the results of disk writes to the mirrored disk set PK 200 and PK 210. Furthermore, since PK 200 and PK 210 are assigned differing sitename identifiers (i.e., "PENNSYLVANIA" in the case of PK 200 and "NEW JERSEY" it the case of PK 210), the MCP operating system checks whether disk writes for both disk pack 200 and disk pack 210 return good results.

If the MCP operating system determines that, for each sitename identifier assigned to one or more of the mirrored set members, a successful result is returned from at least one member of the set assigned the site name identifier, then in Step 250 a "good" I/O result is returned to the application and application processing continues normally. Thus, in the above example, if the MCP operating system determines that disk writes to both disk pack PK 200 and disk pack 210 were successful, the application receives a "good" I/O result and application processing continues normally. The process is then repeated for the next disk write (i.e., processing continues in Step 230).

By contrast, if the MCP operating system determines that for at least one sitename identifier assigned to one or more mirrored set members, no member assigned the identifier experienced a successful disk write, then in Step 260 an IOERROR is returned. Thus, in the example described, if the MCP operating system determines that disk writes to either disk pack PK 200 or disk pack PK 210 were unsuccessful, the application receives an IOERROR. For example, the MCP operating system might be modified to include a new IOERRORTYPE STORESAFEALERT. This error informs applications (and operations) that the system is no longer able to update mirrors at each of the specified locations. Furthermore, since in the above described example, the operator has advantageously chosen the sitenames to refer to the actual geographic locations of the respective disk packs, the absence of a STORESAFEALERT can ensure that there are always updated, geographically distributed copies of critical data.

Depending on the procedures used to handle IOERROR events such as an STORESAFEALERT, application processing may accordingly stop at that point. Preferably, the operating system is also modified to return an extended value to indicate the disk pack causing the problem and its assigned site name. Thus, when an error result is returned, the system administrator has access to information locating the site that experienced the problem. For example, the site administrator may act to remedy the problem and bring on line any problem disk devices or replace the problem devices with new ones.

Figure 3:
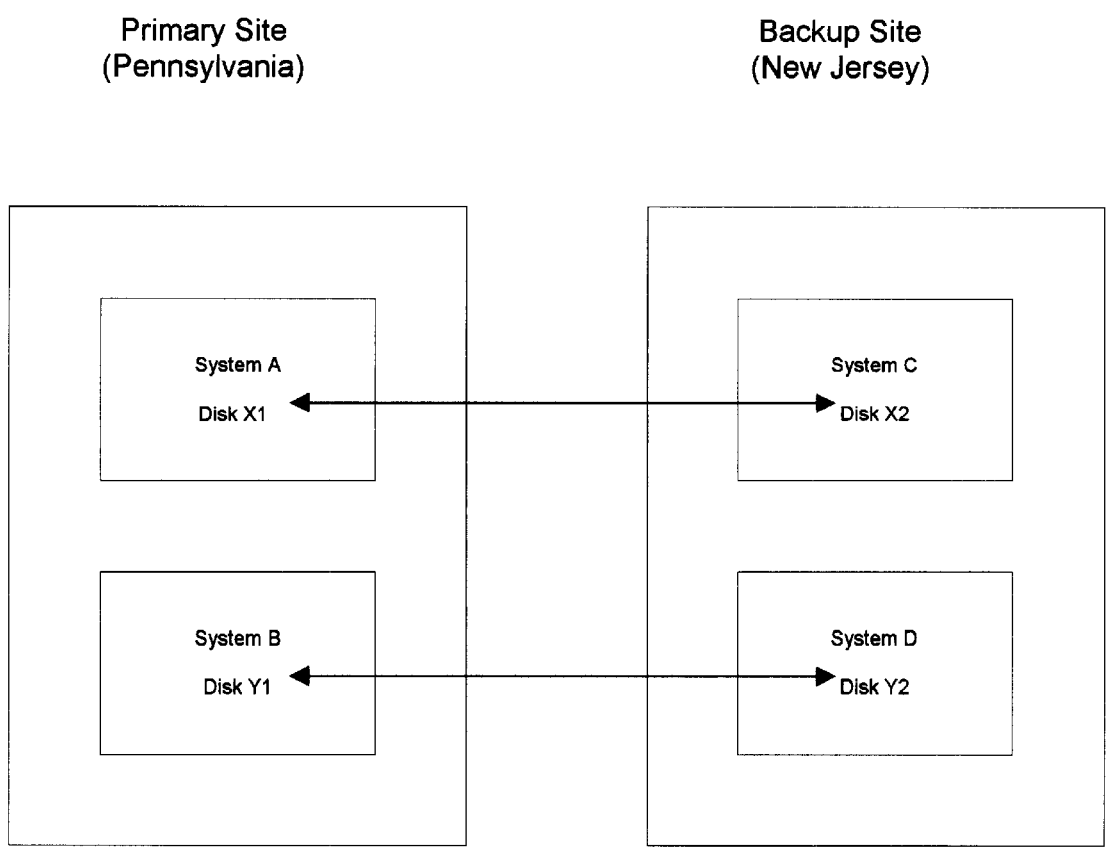
FIG. 3 is a block diagram illustrating a group of system and mirrored sets configured in accordance with an aspect of the present invention.

It should be clear from the above example, aside from any hardware resource or similar limitations, the system 99 operator may configure any number of disk devices, in any combination of geographic areas, as coherent storage mirrors. For example, FIG. 3 illustrates a configuration of disk packs similar to that described in the above example. As illustrated, a company has four systems, Systems A and B, located in Pennsylvania, and Systems C and D, located in New Jersey. Each of the systems may be coupled to and capable of acquiring any of the four illustrated disks: disk x1, disk x2, disk y1 and disk y2. In the example shown, the arrows connecting pairs of disks indicates the pairs are coherent storage mirrors of one another. Here, because disks x1 and y1 are located in Pennsylvania at the company's primary location for day to day operations, the operator has assigned the sitename "PENNSYLVANIA" to those disks. Similarly, because disks x2 and y2 are located in New Jersey at the company's backup location, intended for use in emergencies, the operator has assigned the sitename "NEW JERSEY" to those disks. As a result, assuming again for the purposes of illustration that the systems are Unisys ClearPath NX mainframe systems as modified above, when a disk write is made to the disk pack mirrors x1 and x2 and the write fails for either of the two disk packs, an application running on System A will receive a STORESAFEALERT. When a disk write is issued to the disk mirrors y1 and y2 and the write fails for either of the two disks, an application running on System B will receive an IOERROR or STORESAFEALERT. Thus, the system's 99 coherency of data storage functionality together with proper placement and configuration of primary and backup disks can guarantee that a coherent copy of application data is always in existence in distinct geographic areas.

Figure 4:
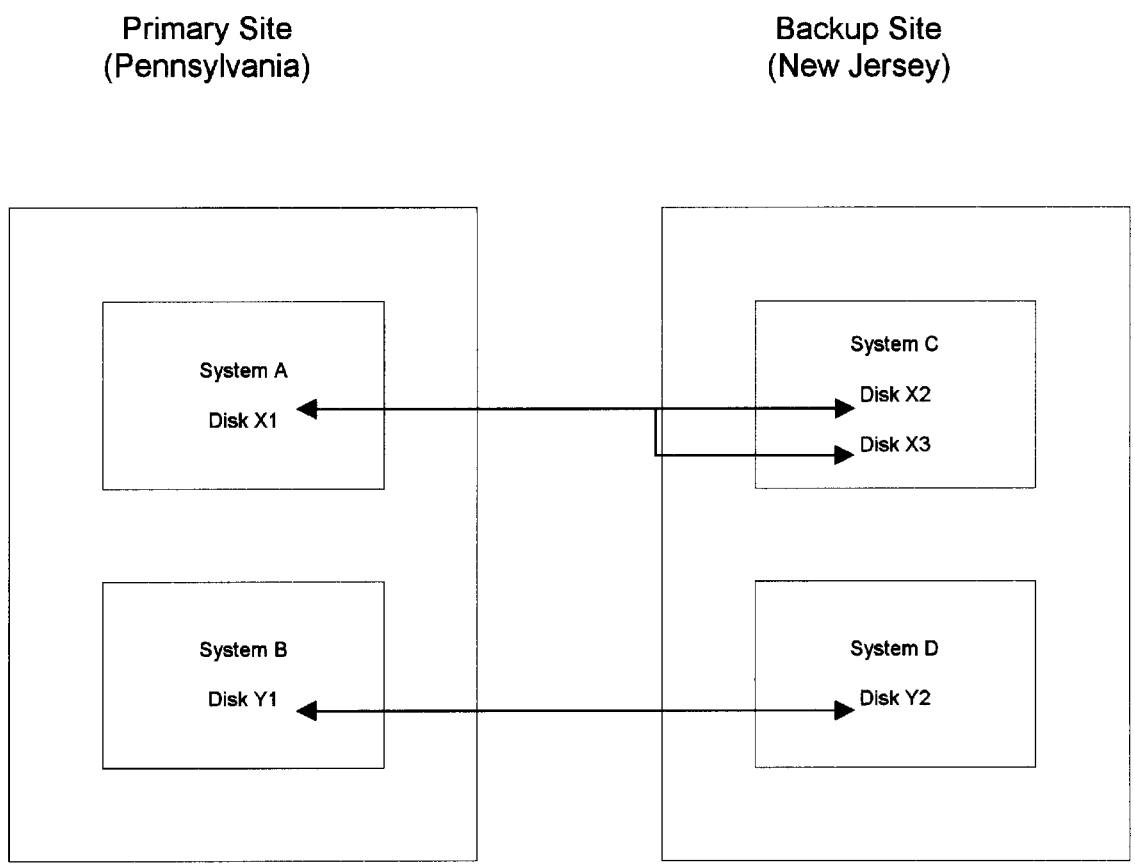
FIG. 4 is a block diagram illustrating a group of systems and mirrored sets configured in accordance with further aspects of the present invention.

FIG. 4 illustrates coherent storage disk configuration in accordance with an alternative embodiment of the present invention. As illustrated, a company again has four systems, Systems A and B, located in Pennsylvania, and Systems C and D, located in New Jersey. Again, each of the systems may be coupled to and capable of acquiring any of the four illustrated disks. In the present configuration, five disks are illustrated: disk x1, disk x2, disk x3, disk y1 and disk y2. As with the example illustrated in FIG. 3, the arrows connecting sets of disks indicate the members of the set are coherent storage mirrors of one another. Again, because disks x1 and y1 are located at the company's primary location in Pennsylvania, the operator has assigned the sitename "PENNSYLVANIA" to those disks. Similarly, because disks x2, x3 and y2 are located at the backup site in New Jersey, the operator has assigned the sitename "NEW JERSEY" to those disks. As a result, as in the example illustrated in FIG. 3, when a disk write is made to the disk mirrors y1 and y2 and the write fails for either of the two disks, the application will receive an STORESAFEALERT. However, the present example differs from that illustrated in FIG. 3 in that the mirrored set comprised disks x1, x2 and x3 has two members at the backup site as opposed to just one. As a result, when a disk write is made to the disk mirrors x1, x2 and x3 the application will receive a STORESAFEALERT only if the write for either disk x1 or for both disks x2 and x3 fails. Again, this coherent data storage functionality guarantees that coherent copies of application data are always available in distinct geographic areas.

Figure 5:
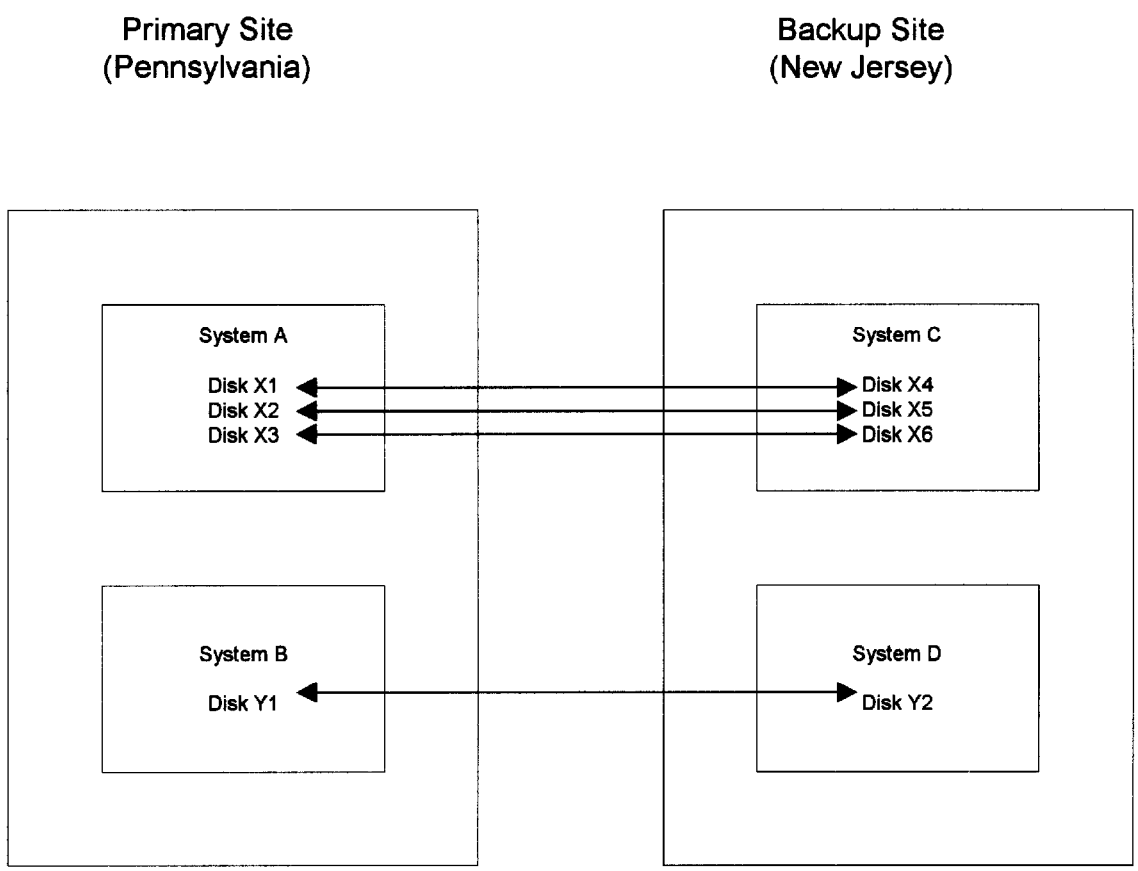
FIG. 5 is a block diagram illustrating a group of systems and mirrored sets configuration in accordance with still further aspects of the present invention.

FIG. 5 illustrates a coherent storage disk set in accordance with yet another embodiment of the present invention. Here, there are eight disks distributed amongst the primary and backup sites: disk x1, disk x2, disk x3, disk x4, disk x5, disk x6, disk y1 and disk y2. The configuration illustrated differs from those illustrated in FIGS. 3 and 4 in that disks x1, x2 and x3 comprise a disk family (multiple physical disks that are aggregated to form a single logical volume); disk x4 is a mirror of x1, disk x5 is a mirror of x2 and disk x6 is a mirror of x3. Disks x1, x2 and x3 are located at the primary site, while disks x4, x5 and x6 are located at the backup site. As a result, in accordance with the an enforced coherency of data storage policy environment as described throughout this specification, when disk writes are made to the family x1, x2 and x3, the application will receive a STORESAFEALERT unless the disk write is successful to at least one copy of the data for each geographic location, regardless of which family member(s) the write was issued to. Again, such logic is sufficient to ensure that that a coherent copy of all application data always exists in separate geographic areas.

Figure 9:
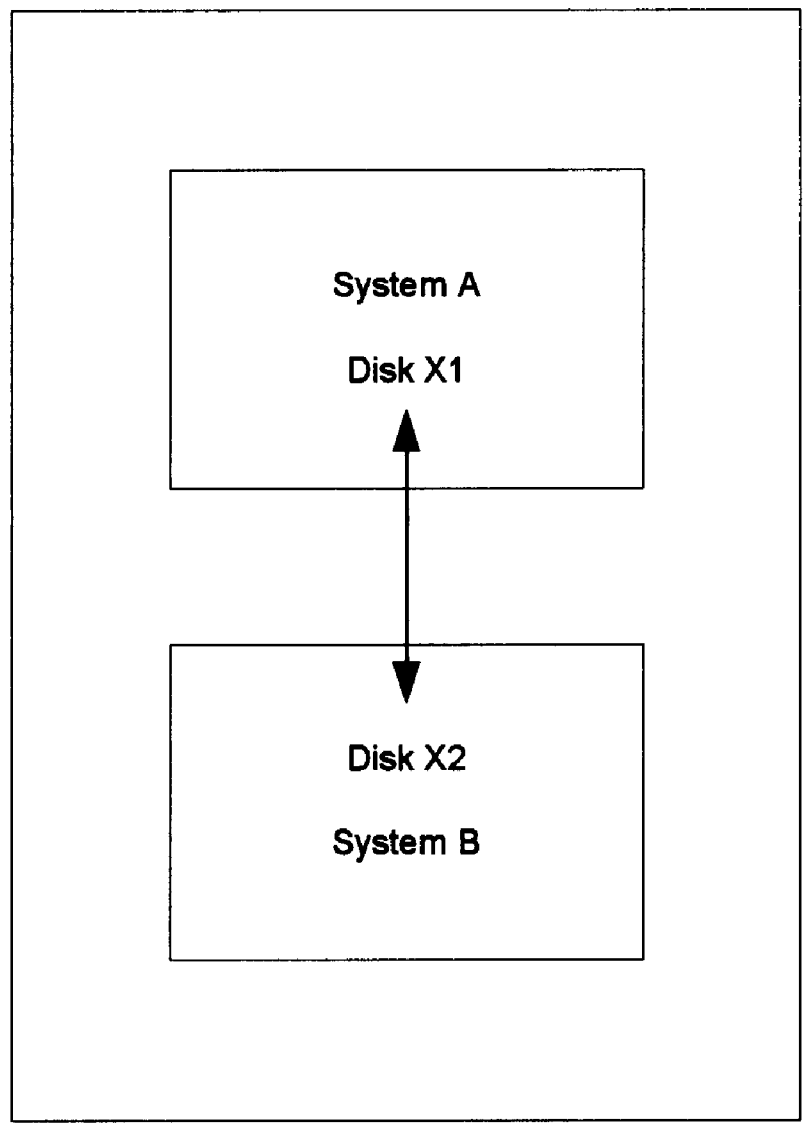
FIG. 9 illustrates a single site configuration of a coherent data set of disk packs in accordance with an embodiment of the invention.

In addition, while FIGS. 3, 4 and 5 depict coherent storage sets of disks distributed among more than one geographic site, it should also be clear that a coherent storage set of disks could also be configured at a single site in accordance with another embodiment of the present invention. In this case, each disk member of the set is associated with a location identifier identifying the location of the disk within the site. Furthermore, the coherency of data storage policy would ensure that during disk writes data is successfully delivered to at least one member of the coherent storage set at each location of within the site. A single-site coherent storage set configuration in accordance with an embodiment of the present invention is illustrated in FIG. 9.

While the basic functionality of a coherency of data storage policy environment is described above, little has thus far been said about how a system 99 operator might handle a STORESAFEALERT response. One way to overcome a STORESAFEALERT is to remedy the problem site with respect to at least one member of the relevant mirrored set. Another way to overcome the problem is to add a functioning disk unit at the problem site. A third possible means to overcoming a STORESAFEALERT response is via an override command. For example, again assuming the system 99 is running a modified MCP operating system, a new command could be featured with the following syntax: "AX OVERRIDE PK<number>," where the "<number>" field refers to a disk pack number. This AX OVERRIDE command would override the coherency of data storage policy environment with respect to the specified disk pack. Thus, an operator could use the command repeatedly, thereby causing the MCP operating system to ignore the coherency of data storage requirement for an entire mirrored set of disks. Once such functionality is overridden for a mirrored set of disks, a successful I/O operation is not required at each geographic site, and during a disk write a good I/O result is returned if a write to any one of the mirrored set is successful. An operator might choose such an override option when the continuation of application processing is considered more important than protection against catastrophic data loss. A fourth possible means to overcome a STORESAFEALERT response is to override the coherency of data storage policy for an entire site. This could be featured with the following syntax: "STORESAFE+ OVERRIDE SITENAME=<sitename>." This command not only overrides any outstanding STORESAFEALERT conditions involving the specified site name, but prevents future STORESAFEALERTs involving that site name. In addition, the ability to remove a site name override request could be featured with the following syntax: "STORESAFE– OVERRIDE <site name>. This capability allows the operator to quickly control multiple STORESAFEALERTs that are associated with a particular geographic location.

While the description above illustrates primarily how the coherency of data storage functionality of the present invention may be used to protect data specified by the physical disk units storing that data, there are situations where logical specifications of the data requiring protection is more meaningful to application developers or system operators. For example, in some instances, the data requiring protection is confined to a file, rather than an entire disk. In other cases, site administrators aggregate two or more physical disks or partition a single physical disk or aggregate multiple partitions to create "disk families," as notes earlier. It is through this higher level concept of a disk family (i.e., or a family of other storage devices) that the administrator or application developer may often view a task. Thus, it is often the ability or inability access to data in a disk family, rather than a particular disk, that determines whether a data protection policy is in force. It is therefore likely that users will want to be sure that a given disk family is configured properly to ensure multi-site protection is possible.

Figure 6:
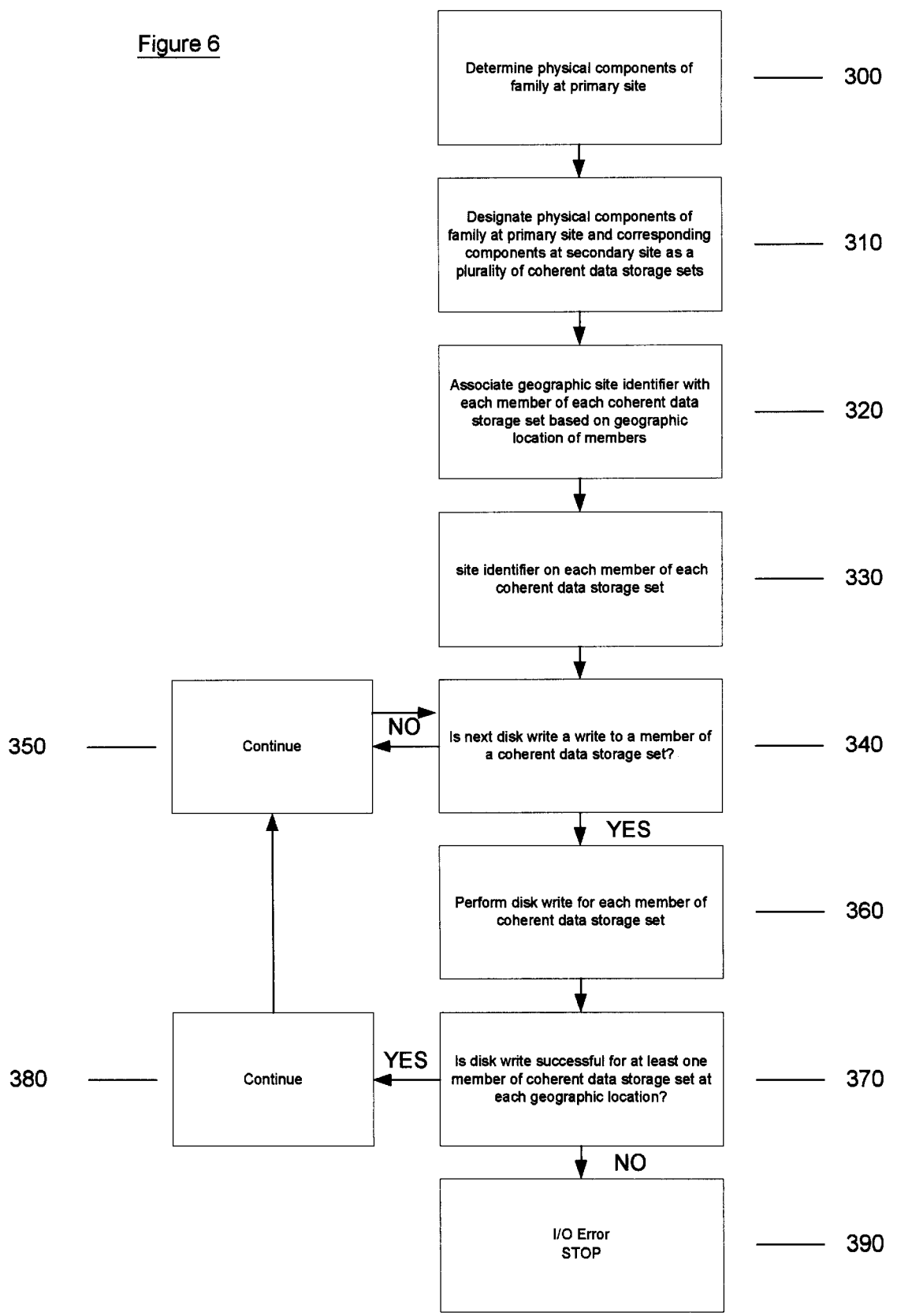
FIG. 6 is a high-level flow chart illustrating an overview of a method for ensuring during program execution the coherency of data stored on a family of disks in accordance with an embodiment of the present invention.

Therefore, in accordance with one embodiment of the present invention, the operating system provides features allowing an operator to specify the required protection for a family of disks. For example, FIG. 6 is a high-level flow chart illustrating an overview of a method for ensuring the coherency of data stored on a family of disks in accordance with an embodiment of the present invention. In Step 300, the operating system, the operator or some combination of both may determine the physical disk components of the family containing the data which requires protection. For example, in a modified MCP based system 99, a new STORESAFE ODT command may be provided to give the operator an easy way to query the use and status of the coherency of data storage feature on the system upon execution of the command. The display 47 will include an indication whether system level enforcement is in effect or not. In addition, for every disk family having at least one coherent storage set enabled member, all family members (and their mirrors) will be displayed. For each entry in this list of disks, the following information may also be provided: family name, pack number, and site name. Thus, using such information, the operator may determine the members of the family of disks containing requiring protection.

Next, in accordance with the system and disk pack configuration similar to that illustrated in FIG. 3, in Steps 310 and 320 an operator designates the physical components of a the family of disks and corresponding disk members at a backup site as a plurality of coherent storage mirror sets using the MIRROR CREATE and STORESAFE+ commands. At the same time, a geographic site identifier is associated with each member of each coherent storage mirror set based on the geographic location of members. Again, the STORESAFE+ command causes the storage of the site identifier labels in the label area of the corresponding disks in Step 330.

Next, the operator specifies the STORESAFE +ENFORCE command. Application processing will can then proceed as illustrated in Step 230, FIG. 2. That is, in Steps 340–370, the MCP operating system checks the results of each disk write to mirrored disks. In addition, for all disk writes to disk packs designated as coherent storage mirrors, the MCP determines whether, for each sitename identifier assigned to one or more of the set members, the I/O is successful for at least one member of the set assigned the site name identifier.

If the MCP operating system determines that, for each sitename identifier assigned to one or more of the mirrored set members, a successful result is returned from at least one member of the set assigned the site name identifier, then in Step 380 a "good" I/O result is returned to the application and application processing continues normally. The process is then repeated for the next disk write (i.e., processing continues in Step 340).

By contrast, if the MCP operating system determines that for at least one sitename identifier assigned to one or more mirrored set members, no member assigned the identifier experienced a successful disk write, then in Step 390 an IOERROR (e, STORESAFEALERT) is returned.

Figure 7:
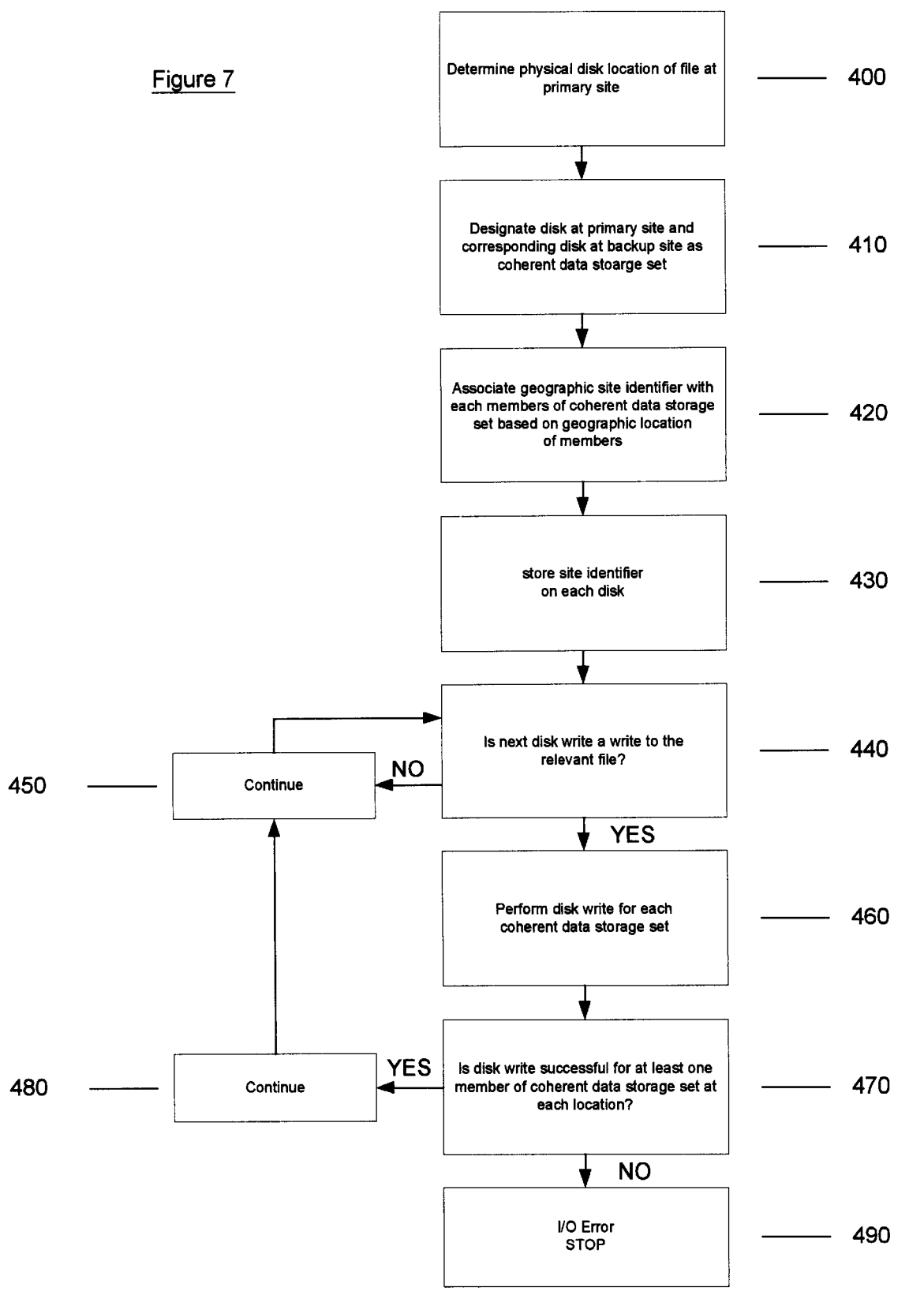
FIG. 7 is a high-level flow chart illustrating an overview of a method for ensuring during program execution the coherency of copies of data located in a file in accordance with an embodiment of the present invention.

Turning now to FIG. 7, it is a high-level flow chart illustrating an overview of a method for ensuring the coherency of data stored in accordance with an embodiment of the present invention where the data requiring protection is located on a single file. In Step 400, the operating system, the operator or some combination of both may determine the physical disk location of the file containing the data which requires protection. Next, in accordance with the system and disk pack configuration similar to that illustrated in FIG. 3, in Steps 410 and 420 an operator designates the physical disk location of the file and a corresponding disk member at a backup site as a coherent storage mirror set using the MIRROR CREATE and STORESAFE+ commands. At the same time, a geographic site identifier is associated with each member of the coherent storage mirror set based on the geographic location of members. Again, the STORESAFE +command causes the storage of the site identifier labels in the label area of the disk members of the set (Step 430).

Next, the operator specifies the STORESAFE +ENFORCE command. Application processing can then proceed begin as illustrated in FIGS. 2 and 6. That is, in Steps 440–470, the MCP operating system checks the results of each disk write to each of the members of the mirrored disk set. In addition, the MCP operating system determines whether the disk writes are successful for both members of the disk set.

If the MCP operating system determines that 1/0 was successful for both members of the mirrored set, then in Step 480 a "good" I/O result is returned to the application and application processing continues normally. The process is then repeated for the next disk write (i.e., processing continues in Step 480). By contrast, if the MCP operating system determines that for least one member of the mirrored set, no member assigned the identifier experienced a successful disk write, then in Step 490 an IOERROR is returned.

Finally, while in the above described examples, an operator determines the physical disk components use to implement the appropriate coherent data storage environment, the optimal data protection policy for any given system may often be application dependent. For example, for some applications, continuation of processing may be more critical than protecting against the risk of future loss of data. For other applications, ensuring data protection is paramount.

Figure 8:
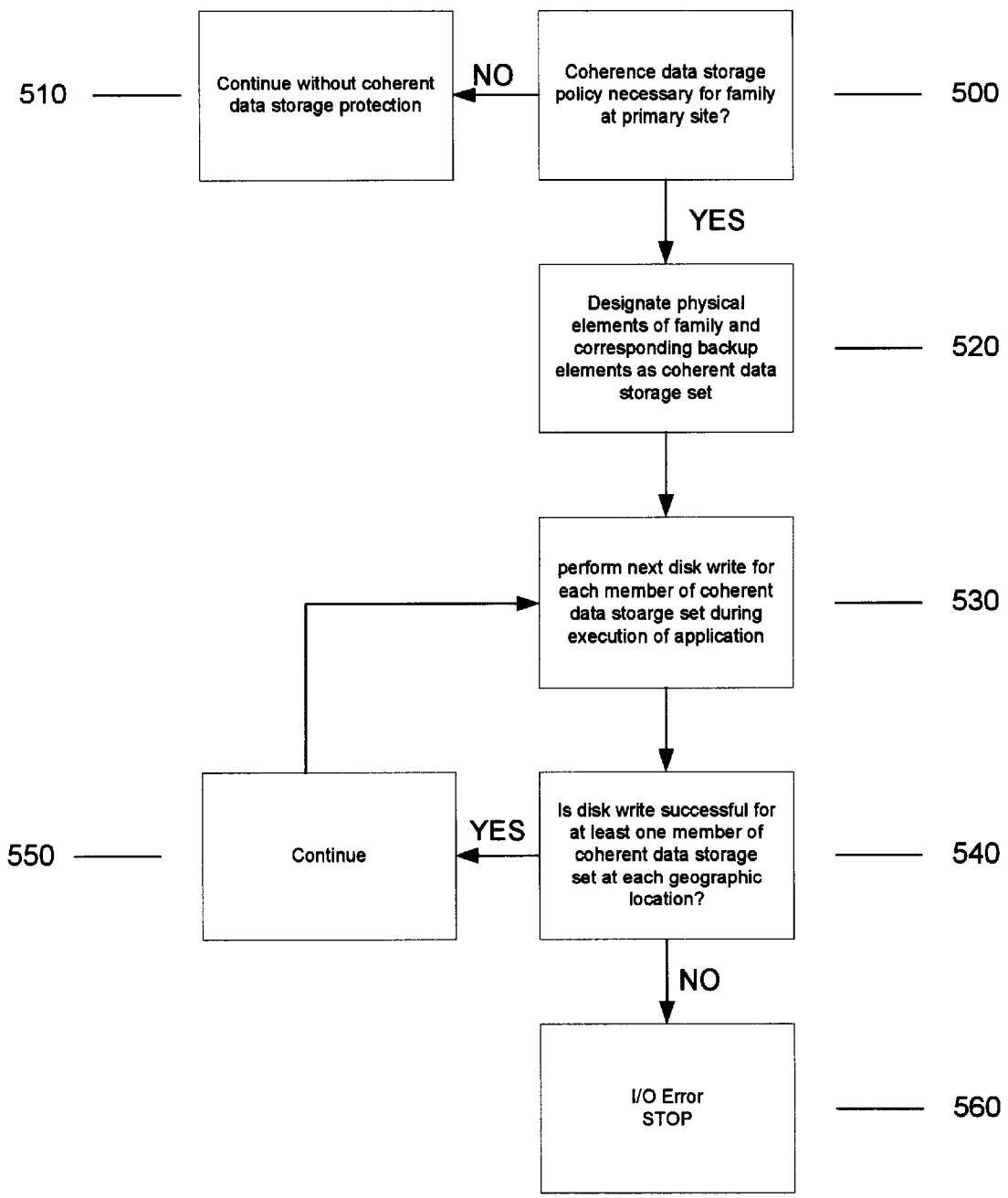
FIG. 8 is a is a high-level flow chart illustrating an overview of a method for determining during program execution the level data coherency protection applicable to data stored on a family of disks and enforcing the chosen data protection policy in accordance with an embodiment of the present invention.

Thus, turning now to FIG. 8, it shows a high-level flow chart illustrating an overview of a method for determining during program execution the level data coherency protection applicable to data stored on a family of disks and enforcing the data protection policy in accordance with an embodiment of the present invention. Thus, in step 500 an application running on the system 99 CPU 21 determines whether a coherent data storage policy is necessary for certain data used by the application. If it is determined that the application does not require a coherency of data storage policy, in Step 510 application I/O continues normally without the coherent data storage requirement. Otherwise, in Step 520, the application interfaces with the MCP operating system to determine the physical components of the family of disks containing the data which requires protection and to configure a coherency of data storage environment for protecting such data (eg, with primary and back up sites having a family of disks containing the data). Finally, processing can continue as illustrated in FIG. 6. That is, in step 530, any disk write to a component of the relevant family is performed for all members of the mirrored coherent storage set to which the component belongs. In Step 540, the MCP operating system will check whether it is true that disk writes are successful for at least one member of the disk set at each geographic location. If the condition is true, in Step 550 application processing continues normally. If the condition is false, in Step 560 an IOERROR is returned.

CONCLUSION

Thus, the examples described above illustrate various instances of an enhanced method and apparatus for ensuring the coherency of data during application processing. While certain aspects of the present invention are described with particularity above, persons skilled in the art will recognize that various modifications could be made to the examples provided without departing from the scope of the invention, which is defined by the claims below. For example, while a number references are made to Unisys enterprise servers with the Unisys proprietary operating system installed, those of ordinary skill in the art will recognize that the present invention could easily be adapted to other systems and servers, including open platform system and Windows®NT servers. Similarly, while the above examples primarily use configurations of disks and disk packs to implement conherency of data storage environments, the present invention may be implemented using a variety of storage media, including magnetic tapes, floppy disks, optical storage media, logical disk volumes, logical files, aggregated disk volumes etc.

What is claimed is:

1. A method for ensuring the coherency of data used by an application executed on a host system, the host system coupled to a group of storage devices containing storage media, the storage media including at least one storage medium storing the data, the method comprising:

a. designating a plurality of the group of storage devices as a mirrored set, the plurality of the group of storage devices including a first number of storage devices located at a first geographic location and a second number of storage devices located at a second geographic location, b. associating a first geographic site identifier with the first number of the plurality of the group of storage devices and a second geographic site identifier with the second number of the plurality of the group of storage devices; and c. executing the application such that any input/output operations are performed for each one of the plurality of the group of storage devices and an error notification is returned unless said input/output operations are successful for at least one of the first number of plurality of the group of storage devices associated with the first geographic site identifier and at least one of the second number of the plurality of the group of storage devices associated with the second geographic site identifier.

2. The method of claim 1 wherein the first geographic identifier refers to a geographic location remote from a geographic location to which the second geographic identifier refers.

3. The method of claim 2 wherein the first geographic identifier refers to a first state located within the United States, and the second geographic identifier refers to a second state located within the United States.

4. The method of claim 1 wherein the first number and the second number are both one.

5. The method of claim 1 wherein the devices are disk devices.

6. The method of claim 5 wherein the disk devices are disk packs.

7. An apparatus for ensuring the coherency of data used by an application executed on a host system, the apparatus comprising:
   a. the host system, including CPU and associated memory, the host system coupled to a mirrored set of disks comprised of members;
   b. a disk mirroring software element comprised of instructions executable by the CPU and associated memory, the disk mirroring software element causing the host system to perform every disk write operation of the application for each one of the members when the disk mirroring software element is executed on the CPU; and
   c. a coherency of data storage policy software element comprised of instructions executable by the CPU, the coherency of data storage policy software element causing an error notification to be returned to the application unless said every disk write operation of the application is successful for at least one of a first number of the members associated with a first geographic site identifier and at least one of a second number of the members associated with a second geographic site identifier.

8. The apparatus of claim 7 wherein the first geographic identifier refers to a geographic location remote from a geographic location to which the second geographic identifier refers.

9. The apparatus of claim 8 wherein the first geographic identifier refers to a first state located within the United States, and the second geographic identifier refers to a second state located within the United States.

10. A method for ensuring the coherency of data used by an application executed on a host system and stored on a file, the host system coupled to a group of storage devices, the method comprising:
   a. determining a primary one of the group of storage devices, the primary one of the group of storage sites storing the file;
   b. designating a plurality of the group of storage devices as a mirrored set, the plurality of the group of storage devices including the primary one;
   c. associating a first geographic site identifier with a first number of the plurality of the group of storage devices and a second geographic site identifier with a second number of the plurality of the group of storage devices; and
   d. executing the application such that any input/output operations are performed for each one of the plurality of the group of storage devices and an error notification is returned unless said input/output operations are successful for at least one of the first number of plurality of the group of storage devices associated with the first geographic site identifier and at least one of the second number of the plurality of the group of storage devices associated with the second geographic site identifier.

11. The method of claim 10 wherein the first geographic identifier refers to a geographic location remote from a geographic location to which the second geographic identifier refers.

12. The method of claim 11 wherein the first geographic identifier refers to a first state located within the United States, and the second geographic identifier refers to a second state located within the United States.

13. The method of claim 10 wherein the first number and the second number are both one.

14. The method of claim 10 wherein the storage devices are disk device sites.

15. The method of claim 14 wherein the disk device sites are disk packs.

16. A method for ensuring the coherency of data used by an application executed on a host system and stored on a family of disks, the host system coupled to a group of disks including the family of disks, the method comprising:
   a. determining a plurality of disk components comprising the family of disks; and
   b. for each one of the plurality of disk components,
      i. designating a plurality of the group of disks as a mirrored set, the plurality of the group of disks including the one of the plurality of disk components;
      ii. associating a first geographic site identifier with a first number of the plurality of the group of disks and a second geographic site identifier with a second number of the plurality of the group of disks; and
      iii. executing the application such that any input/output operations are performed for each one of the plurality of the group of disks and an error notification is returned unless said input/output operations are successful for at least one of the first number of plurality of the disks associated with the first geographic site identifier and at least one of the second number of the plurality of the group of disks is associated with the second geographic site identifier.

17. The method of claim 16 wherein the first geographic identifier refers to a geographic location remote from a geographic location to which the second geographic identifier refers.

18. The method of claim 17 wherein the first geographic identifier refers to a first state located within the United States, and the second geographic identifier refers to a second state located within the United States.

19. The method of claim 16 wherein the first number and the second number are both one.

20. A method for ensuring the coherency of data used by an application executed on a host system in the event the data warrants coherency of data storage protection, the host system coupled to a group of storage devices containing storage media, the storage media including at least one storage medium storing the data, the method comprising:
   a. determining whether the data warrants coherency of data storage protection; and
   b. in the event the data warrants coherency of data storage protection, i. designating a plurality of the group of storage devices as a mirrored set;
ii. associating a first geographic site identifier with a first number of the plurality of the group of storage devices and a second geographic site identifier with a second number of the plurality of the group of storage devices; and
iii. executing the application such that any input/output operations are performed for each one of the plurality of the group of storage devices and an error notification is returned unless said input/output operations are successful for at least one of the first number of plurality of the group of storage devices associated with the first geographic site identifier and at least one of the second number of the plurality of the group of storage devices associated with the second geographic site identifier.

21. A method for ensuring the coherency of data used by an application executed on a host system, the host system coupled to a group of storage devices containing storage media, the storage media including at least one storage medium storing the data, the method comprising:

a. designating a plurality of the group of storage devices as a mirrored set, the plurality of the group of storage devices including a first number of storage devices located at a first location of a computer site and a second number of storage devices located at a second location of the computer site;

b. associating a first location identifier with the first number of storage devices and a second location identifier with the second number of storage devices, the first location identifier differing from the second location identifier; and c. executing the application such that any input/output operations are performed for each one of the plurality of the group of storage devices designated as a mirrored set and an error notification is returned unless said input/output operations are successful for at least one of the first number of storage devices associated with the first location identifier and at least one of the second number of storage devices associated with the second location identifier.

22. The method of claim 21 wherein the first number and the second number are both one.

23. The method of claim 21 wherein the devices are disk devices.

24. The method of claim 23 wherein the disk devices are disk packs.

\* \* \* \* \*